US012490075B2

(12) United States Patent
Casati

(10) Patent No.: US 12,490,075 B2
(45) Date of Patent: *Dec. 2, 2025

(54) MANAGING UE CONFIGURATION IN A SERVING PLMN IN THE PRESENCE OF A DEFAULT CONFIGURATION FOR THE UE FOR ALL PLMNs

(71) Applicant: NOKIA TECHNOLOGIES OY, Espoo (FI)

(72) Inventor: Alessio Casati, West Molesey (GB)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 18/215,494

(22) Filed: Jun. 28, 2023

(65) Prior Publication Data
US 2023/0345226 A1 Oct. 26, 2023

Related U.S. Application Data

(63) Continuation of application No. 16/518,867, filed on Jul. 22, 2019, now Pat. No. 11,729,600.
(Continued)

(51) Int. Cl.
*H04W 4/00* (2018.01)
*H04W 8/12* (2009.01)
(Continued)

(52) U.S. Cl.
CPC ............. *H04W 8/12* (2013.01); *H04W 48/18* (2013.01); *H04W 60/00* (2013.01); *H04W 84/042* (2013.01)

(58) Field of Classification Search
CPC .... H04W 48/14; H04W 48/18; H04W 84/042
See application file for complete search history.

(56) References Cited

U.S. PATENT DOCUMENTS

2014/0302812 A1 10/2014 Yu
2017/0257803 A1 9/2017 Tenny et al.
(Continued)

FOREIGN PATENT DOCUMENTS

EP 3536009 A1 9/2019
EP 3641424 A1 4/2020
(Continued)

OTHER PUBLICATIONS

"3rd Generation Partnership Project; Technical Specification Group Services and System Aspects; System Architecture for the 5G System; Stage 2 (Release 15)", 3GPP TS 23.501, v1.3.0, Sep. 2017, pp. 1-174.
(Continued)

*Primary Examiner* — Bo Hui A Zhu
(74) *Attorney, Agent, or Firm* — ALSTON & BIRD LLP

(57) ABSTRACT

Methods and apparatus, including computer program products, are provided for managing user equipment configuration. In some example embodiment, there may be provided an apparatus including at least one processor and at least one memory including computer program code, the at least one memory and the computer program code configured to, with the at least one processor, cause the apparatus to at least: detect a network for registration; and send, to the network, an indication that the apparatus is using a default configuration for at least one service available at the network, when the apparatus is configured with the default configuration but does not include a network specific configuration for the network. Related systems, methods, and articles of manufacture are also described.

29 Claims, 7 Drawing Sheets

Related U.S. Application Data

(60) Provisional application No. 62/702,291, filed on Jul. 23, 2018.

(51) Int. Cl.
*H04W 48/18* (2009.01)
*H04W 60/00* (2009.01)
*H04W 84/04* (2009.01)

(56) References Cited

U.S. PATENT DOCUMENTS

| | | | |
|---|---|---|---|
| 2017/0303259 A1 | 10/2017 | Lee et al. | |
| 2017/0367036 A1 | 12/2017 | Chen et al. | |
| 2018/0227873 A1 | 8/2018 | Vrzic et al. | |
| 2018/0324761 A1 | 11/2018 | Velev et al. | |
| 2019/0174449 A1 | 6/2019 | Shan et al. | |
| 2019/0200285 A1 | 6/2019 | Velev et al. | |
| 2019/0261157 A1* | 8/2019 | Ramle | H04W 48/18 |
| 2019/0357129 A1 | 11/2019 | Park et al. | |
| 2020/0336937 A1* | 10/2020 | Youn | H04W 48/16 |
| 2020/0367148 A1 | 11/2020 | Baek et al. | |

FOREIGN PATENT DOCUMENTS

| | | |
|---|---|---|
| EP | 3729867 A1 | 10/2020 |
| EP | 3449663 B1 | 3/2022 |
| EP | 3664492 B1 | 4/2022 |
| EP | 3416430 B1 | 7/2022 |
| EP | 3689035 B1 | 9/2022 |
| JP | 2018-534867 A | 11/2018 |
| KR | 20170119296 A | 10/2017 |
| WO | WO 2017/081864 A1 | 5/2017 |
| WO | WO 2018/066977 A1 | 4/2018 |
| WO | 2018/082521 A1 | 5/2018 |
| WO | WO 2018/093168 A1 | 5/2018 |
| WO | WO 2018/234085 A1 | 12/2018 |
| WO | WO 2019/123016 A1 | 6/2019 |

OTHER PUBLICATIONS

Advisory Action for U.S. Appl. No. 16/518,867 dated Jun. 1, 2021.
Decision to Grant for Japanese Application No. 2021-503540 dated Dec. 14, 2022, 5 pages.
Ericsson, "Allowed NSSAI Per Access Type and PLMN Alignment", 3GPP TSG CT WG1 #111bis, C1-184213, Jul. 13, 2018.
Final Office Action for U.S. Appl. No. 16/518,867 dated Dec. 29, 2021.
Final Office Action for U.S. Appl. No. 16/518,867 dated Mar. 23, 2021.
First Examination Report for Indian Application No. 202147006490 dated Jan. 14, 2022, 7 pages.
Huawei et al., "Network Slice Instance Selection", 3GPP Draft, S2-175296, 3GPP, Jul. 3, 2017, 1 page.
International Search Report and Written Opinion for Patent Cooperation Treaty Application No. PCT/US2019/042847 dated Oct. 7, 2019, 15 pages.
Mediatek, Inc., "Handling of Network Slicing Information in the UE", 3GPP Draft, C1-174205, 3GPP, Oct. 22, 2017, 7 pages.
Nokia et al., "Default S-NSSAI Not Added by AMF During Session Establishment", 3GPP Draft, C1-172967, 3GPP, Aug. 20, 2017, 5 pages.
Non-Final Office Action for U.S. Appl. No. 16/518,867 dated Jul. 2, 2021.
Non-Final Office Action for U.S. Appl. No. 16/518,867 dated Nov. 20, 2020.
Notice of Allowance for U.S. Appl. No. 16/518,867 dated Dec. 7, 2022.
Notice of Allowance for U.S. Appl. No. 16/518,867 dated Jun. 14, 2022.
Office Action for European Application No. 19749941.1 dated Feb. 24, 2023, 5 pages.
Office Action for Indonesian Application No. P00202100487 dated Apr. 4, 2023, 8 pages.
Office Action for Japanese Application No. 2021-503540 dated Feb. 7, 2022, 4 pages.
Office Action for Japanese Application No. 2021-503540 dated Jun. 2, 2022, 6 pages.
Office Action for Vietnamese Application No. 1-2021-00551 dated Apr. 19, 2021, 2 pages.
Qualcomm Korea, "Ran5 Testing of Network Slicing in 5GC", 3GPP Draft, R5-194039, 3GPP, May 13, 2019, 3 pages.
Notice of Allowance for U.S. Appl. No. 16/518,867 adted Mar. 30, 2023.
Office Action for Chinese Application No. 201980049278.9 dated Dec. 23, 2023, 12 pages.
Decision to Grant for Indonesian Application No. P00202100487 dated Nov. 29, 2023, 2 pages.
Office Action for Japanese Application No. 2023-003513 dated Nov. 6, 2023, 3 pages.
Office Action for Vietnamese Application No. 1-2021-00551 dated Jan. 18, 2024, 3 pages.
Decision to Grant for Japanese Application No. 2023-003513 dated Feb. 19, 2024, 4 pages.
Office Action for European Application No. 19749941.1 dated Mar. 13, 2024, 7 pages.
Ericsson, "Minimum UE logic for support of network slicing", SA WG2 Meeting #122-Bis, S2-175443, (Aug. 21-25, 2017), 10 pages.
Huawei, "Configuration of RAN Transport network related information", 3GPP TSG SA WG5 (Telecom Management) Meeting #112, S5-171664, (Mar. 27-31, 2017), 4 pages.
Interdigital, "Configuration of Slice-Supported SSC Modes at UE", SA WG2 Meeting #120, S2-171976, (Mar. 27-31, 2017), 3 pages.
LG Electronics, "NSSAI Privacy Handling", 3GPP TSG SA WG3 (Security) Meeting #88Bis Adhoc, S3-172494, (Oct. 9-13, 2017), 2 pages.
Nokia et al., "Removal of the Configured NSSAI valid for all PLMNs", 3GPP TSG-SA WG2 Meeting #128, S2-186629, (Jul. 2-6, 2018), 3 pages.
Notice of Grant for Chinese Application No. 201980049278.9 dated Jun. 5, 2024, 7 pages.
Qualcomm Incorporated et al., "TS 23.501: network selection of slices requested by UE for prioritization and co-existence", SA WG2 Meeting #S2-122, S2-174443, (Jun. 26-30, 2017), 8 pages.
Office Action for European Application No. 19749941.1 dated Aug. 5, 2024, 6 pages.
Decision to Grant for Japanese Application No. 2024-068249 dated Aug. 1, 2024, 4 pages.
Extended European Search Report for European Application No. 24174409.3 dated Dec. 13, 2024, 13 pages.
Notice of Allowance for Vietnamese Application No. 1-2021-00551 dated Nov. 29, 2024, 2 pages.
Office Action for Indonesian Application No. P00202305911 dated Jan. 23, 2025, 6 pages.
Office Action for Malaysian Application No. PI2021000267 dated Nov. 25, 2024, 6 pages.
Office Action for Japanese Application No. 2024-150617 dated Jun. 2, 2025, 6 pages.
Office Action for Malaysian Application No. PI2021000267 dated May 24, 2025, 1 page.
Office Action for Philippine Application No. Jan. 2021/550081 dated May 28, 2025, 6 pages.
Qualcomm Incorporated, "Final conclusions on Configured NSSAI not associated to any PLMNs", SA WG2 Meeting #128, S2-186659, (Jul. 2-6, 2018), 2 pages.
Drevon, Nicolas, "Re: [6.5.10] S2-187128 and S2-187129", Retrieved via the Internet on Jun. 27, 2025, <URL:https://list.etsi.org/scripts/wa.exe?A2=3GPP_TSG_SA_WG2;4005c0d3.1807A&S=>, (Jul. 6, 2018), 3 pages.
Samsung, "SBI friendly UE policy delivery procedure", 3GPP TSG SA WG2 Meeting #128, S2-187581, (Jul. 2-6, 2018), 11 pages.
Sharp, "AMF setting EMF based on UE's capability/operator policy",

(56) References Cited

OTHER PUBLICATIONS

3GPP TSG-CT WG1 Meeting #111bis, Change Request CR 0152, C1-184400, (Jul. 9-13, 2018), 17 pages.

* cited by examiner

MANAGING UE CONFIGURATION IN A SERVING PLMN IN THE PRESENCE OF A DEFAULT CONFIGURATION FOR THE UE FOR ALL PLMNs

CROSS-REFERENCE TO RELATED APPLICATIONS

This application is a continuation of U.S. Non-Provisional patent application Ser. No. 16/518,867, filed Jul. 22, 2019 and entitled "Managing UE Configuration in a Serving PLMN in the Presence of a Default Configuration for the UE for all PLMNs," which claims priority to, and the benefit of, U.S. Provisional Patent Application Ser. No. 62/702,291, filed Jul. 23, 2018 and entitled "Managing UE Configuration in a Serving PLMN in the Presence of a Default Configuration for the UE for all PLMNs," the entire disclosures of each of which are hereby incorporated herein by reference in their entireties for all purposes.

FIELD

The subject matter described herein relates to wireless communications.

BACKGROUND

As the cellular system including the Fifth Generation (5G) system supports an increasing number of devices and services including applications with a wide range of use cases and diverse needs with respect to bandwidth, latency, and reliability requirements, the cellular system may need to prioritize resources across the wireless access network and the core network (and/or for example, prioritizing across the control plane and the user plane) to support differentiation among different services.

SUMMARY

Methods and apparatus, including computer program products, are provided for managing configuration updates.

In some example embodiment, there may be provided an apparatus including at least one processor and at least one memory including computer program code, the at least one memory and the computer program code configured to, with the at least one processor, cause the apparatus to at least: detect a network for registration; and send, to the network, an indication that the apparatus is using a default configuration for at least one service available at the network, when the apparatus is configured with the default configuration but does not include a network specific configuration for the network.

In some variations, one or more of the features disclosed herein including the following features can optionally be included in any feasible combination. The default configuration may include a configuration for accessing the at least one service on all public land mobile networks the apparatus may access while roaming. The network specific configuration may include a configuration for accessing the at least one service, the configuration being specific to the network serving the apparatus. The default configuration may include a default set of requested network slice selection assistance information that is valid for all public land mobile networks the apparatus may access while roaming. The network specific configuration may include requested network slice selection assistance information specific to the network serving the apparatus. The network may be accessed in accordance with the default configuration or the network specific configuration for the at least one service. The indication may be an explicit indication carried by a registration message, an authorization message, and/or a request message. The network specific configuration may be received from the network and in response to the indication that the apparatus is using a default configuration, a network specific configuration. An indication that the apparatus is using a network specific configuration for the at least one service available at the network may be sent to the network, when the apparatus is configured with the default configuration and includes the network specific configuration for the network. The indication that the apparatus is using a network specific configuration may be implicit.

In some example embodiment, there may be provided an apparatus including at least one processor and at least one memory including computer program code, the at least one memory and the computer program code configured to, with the at least one processor, cause the apparatus to at least: receive an indication that a user equipment is using a default configuration for at least one service available at the network, when the user equipment is configured with the default configuration but does not include a network specific configuration for the network; detect, based on the indication, the user equipment is to be updated with a network specific configuration; and send, in response to the detected indication, the network specific configuration.

In some variations, one or more of the features disclosed herein including the following features can optionally be included in any feasible combination. The default configuration may include a configuration for accessing the at least one service on all public land mobile networks the user equipment may access while roaming. The network specific configuration may include a configuration for accessing the at least one service, the configuration being specific to the network serving the user equipment. The default configuration may include a default set of requested network slice selection assistance information that is valid for all public land mobile networks the user equipment may access while roaming. The network specific configuration may include requested network slice selection assistance information specific to the network serving the user equipment. The indication may be an explicit indication included in a registration message, an authorization message, and/or a request message received by the apparatus. A network specific configuration may be sent, in response to the indication that the user equipment is using a default configuration, a network specific configuration. An indication may be received that the user equipment is using a network specific configuration for the at least one service available at the network, when the user equipment is configured with the default configuration and includes the network specific configuration for the network. The indication that the apparatus is using a network specific configuration may be implicit. The apparatus may comprises or may be comprised in a network node, wherein the network node may comprises a base station and/or an access and mobility management function The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

Figure 1:
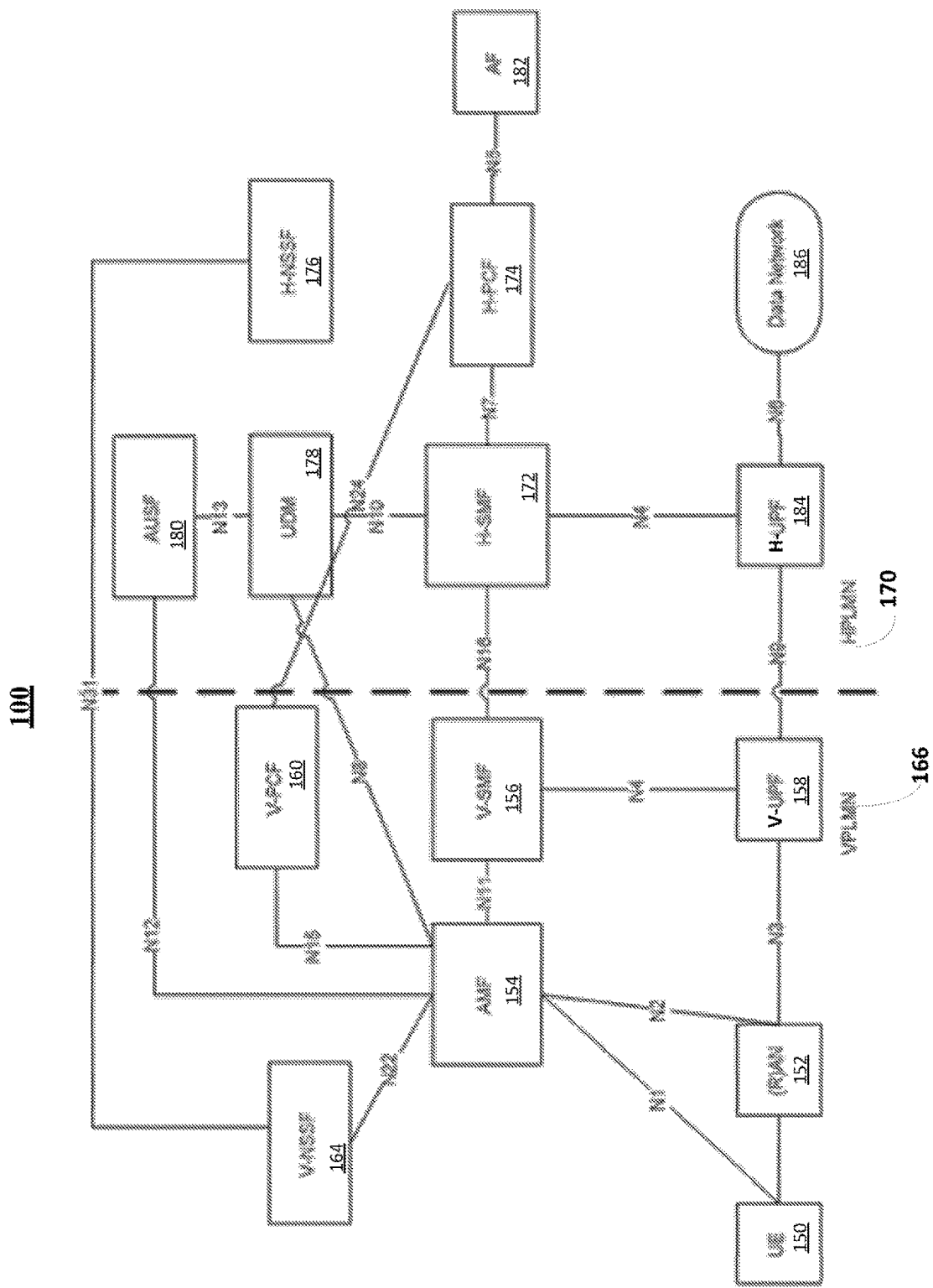
FIG. 1 depicts an example of a portion of a 5G wireless network, in accordance with some example embodiments.

Like labels are used to refer to same or similar items in the drawings.

DETAILED DESCRIPTION

In systems such as cellular systems, a user equipment (UE) may be provisioned with a default configuration, such as one or more settings, that can be applied at the UE while the UE is roaming as well as while in a home network. This default configuration may allow the UE to immediately access certain services offered by a network. The network may allow access based on the UE's (or associated user's) subscription and the serving network operator support of the certain services. A problem may exist, however, with respect to how to configure the UE with a serving network's specific configuration, when the serving network has a specific configuration that ought to be applied to override a default configuration in the UE. A solution may be that a serving network (which, for example, may provide the UE with a network specific configuration) always provides to a UE a configuration, when the UE visits the serving network. However, this may be resource intensive with respect to network resources. Another possible solution may be to have the UE's home network handle configuration of the UE for all networks, but this may require the home network to know the details of all possible serving networks for the UE. This solution may, however, not be desirable as it may be overly complex to manage at least from the perspective of the home network (as the home network would need to have current, updated network specific configuration information for a relatively large quantity of serving networks).

In some example embodiments, there is provided a way for the serving network to be able to detect that the UE is operating using a pre-set configuration, such as a default configuration, and then the serving network may proceed to update the UE with a more current UE configuration, such as a network specific configuration for the serving network. In some example embodiments, the pre-set configuration relates to access by the UE of at least one service available at the network. In some example embodiments, the at least one service includes network slices, although other types of services may be used as well.

In some example embodiments, an explicit indication may be provided to the network to enable the network to know that the UE is using a pre-set, such as a default, configuration. In some example embodiments, the indication is carried by a request, such as a registration request or other type of message, sent by the UE to the network.

Before providing additional description regarding the UE configuration in accordance with some example embodiments, an example of a portion of a 5G wireless network 100 is described with respect to FIG. 1.

The 5G wireless network 100 may include a user equipment (UE) 150 configured to wirelessly couple to a radio access network (RAN) 152 being served by a wireless access point, such as a base station, wireless local area network access point, home base station, and/or other type of wireless access point. When visiting a network, the UE may access the network's radio access network.

The network 100 may include a core network, which may include an access and mobility management function (AMF) 154, a visiting session management function (V-SMF) 156, a visiting policy control function (v-PCF) 160, a visiting network slice selection function (v-NSSF) 164, and/or a visiting user plane function (V-UPF) 158. In the example of FIG. 1, devices 152-164 may be associated with a visiting public land mobile network (VPLMN) 166.

The network 100 and/or the core network may include devices having functions supporting a home public land mobile network (HPLMN) 170 as well. For example, these devices in the HPLMN 170 may include devices and corresponding functions for "home" wireless local area network (WLAN) access, offloading, and/or non-3GPP access. These devices may include a home SMF 172, a home PCF 174, a home NSSF 176, unified data management 178, an authentication server function (AUSF) 180, an application function (AF) 182, a home user plane function (H-UPF) 184, and a data network (DN) 186.

FIG. 1 also depicts service interfaces, such as N1, N2, N3, N4, N6, N7, N11, N15, N18, N24, and/or the like. The architecture, nodes (including AMF, V-PCF, H-PCF, H-SMF, and V-SMF as well as other devices depicted at FIG. 1), and the service interfaces may be defined in accordance with a standard, such as 3GPP TS 23.501, although other standards as well as proprietary interfaces may be used. Although FIG. 1 depicts a single visiting network and a single home network, other quantities of visiting and/or home network may be included as well.

A network slice, as noted above, refers to a logical network that provides specific network capabilities and network characteristics. The network slice may be considered a logical end-to-end network that can be dynamically created, so that a given UE may access different network slices over the same radio access network (e.g., over the same radio interface). The network slices can provide different services and/or have different QoS needs/requirements. 3GPP TS 23.501, System Architecture for the 5G System, describes examples of network slices.

The UE's subscription information may dictate the configuration information related to the quantity, QoS type, and/or identity of the network slices. The UE's configuration information (provided by the network when registering in a PLMN, such as a VPLMN and/or HPLMN) may include one or more network slice identifiers, such as one or more single network slice selection assistance information (S-NSSAI). The S-NSSAI may be comprised of: a) a slice/service type (SST), which refers to the expected network slice behavior in terms of features and services; and/or b) a slice differentiator (SD), which is optional information that complements the slice/service type(s) to differentiate amongst multiple network slices of the same slice/service type.

The following example uses an example related to network slices, although this is for illustrative purposes as other types of services may be used as well. In the case of 5G for example, the UE may be configured by the serving network, such as a visited public land mobile network (VPLMN) and/or a home public land mobile network (HPLMN), with information, such as configuration information to enable a service such as network slicing in accordance with, for example, 3GPP TS 23.501. This configuration information enables the UE to use and thus access one or more services, such as network slicing, in the serving network based on the UE's subscription (as well as the PLMN configuration information provided to the UE by the network). This configuration information may vary over time due to local decisions by the VPLMN or for other reasons as well such as due to the home network, or the HPLMN, implementing changes to the UE's subscription. In the case of 3GPP TS 23.501 for example, the configuration information may be related to a network slice, in which case the configuration information may be referred to as the configured network slice selection assistance information (NSSAI). The collection of S-NSSAIs may each point to a given network slice.

In 3GPP TS 23.501 for example, the registration to a set of network slices may be in accordance with the following. When there is no requested NSSAI included in a UE's request (e.g., registration request), when the mapping of the S-NSSAIs in the requested NSSAI to the corresponding values in the configured NSSAI for the HPLMN is incorrect, and/or when an S-NSSAI is rejected in the PLMN, the access and mobility management function 154 (AMF) may update the UE's 150 configuration information for the network slice(s) associated with the PLMN. The UE may not include the requested NSSAI (e.g., an NSSAI that includes the S-NSSAIs of the slices the UE requests the network to provide the UE with access to) in a PLMN registration request, when the UE does not have "slice" configuration information for use at the PLMN. The PLMN may then configure the UE with the configured NSSAI for the PLMN. And if the PLMN detects an invalid requested NSSAI, a configuration of the UE may be performed.

However if a default configuration is present at the UE, then the requested NSSAI can be provided to the PLMN in all cases, and this may be considered a valid requested NSSAI. The default configuration represents a configuration which is to be used by the UE and is considered valid for some, if not all, PLMNs; unless for example the UE has a PLMN/network specific configuration that should be used at for example a specific serving network. For example, the configuration information may, in the case of network slices, include an S-NSSAI or set of S-NSSAIs that are understood by some, if not all, PLMNs the UE can roam to. As such, if more S-NSSAIs are to be used at the PLMN, those additional S-NSSAIs may not be configured into the UE as the UE is not providing incorrect requested NSSAI (e.g., the incorrect requested NSSAI would trigger the network to update the UE with a configuration information update). Since the UE has a default NSSAI to be used in some if not all PLMNs, the UE may include default NSSAI in, for example, the registration message sent to the network, so the UE cannot send an empty requested NSSAI in the registration request. If the UE has indeed obtained a specific configuration for the serving PLMN, but just uses the network slices that are in the default configuration for some if not all PLMNs, the serving network may not be able to detect that the UE missed the PLMN-specific configuration because the default configuration is being used by the UE. This example with respect to network slices illustrates a need for an indication to be sent to the network to enable the network to detect whether the UE is using a default configuration.

In some example embodiments, when the UE is configured with a default configuration that applies for some, if not all, PLMNs that do not have a PLMN-specific configuration and the UE is registering with a serving network for which it has no configuration information specific to the serving network (e.g., serving PLMN), the UE may use, as its configuration, a pre-set configuration, such as a default configuration. And, the UE may indicate to the network use of the pre-set configuration, such as the default configuration. The UE may indicate the use to the network via a request message such as a network registration message and/or other type of message, in accordance with some example embodiments.

If the serving PLMN is operated in such a way that the UE is expected to be configured in the serving PLMN with a network specific (e.g., PLMN-specific) configuration, the serving PLMN may provide the UE with the necessary PLMN-specific configuration. The serving PLMN may provide the UE PLMN-specific configuration, in response to the indication, such as the request or registration message sent by the UE to the network. If the serving PLMN is operated in such a way that the UE is expected to use, in the PLMN, only a default configuration for all PLMNs, the serving PLMN (as there is, e.g., no PLMN specific configuration available for the UE) need not provide the UE with a PLMN-specific configuration. The serving PLMN may provide the UE PLMN-specific configuration, in response to the indication, such as the request or registration message sent by the UE to the network. The serving PLMN may be a visiting PLMN, although it may also be a home PLMN.

When the UE includes, as part of its configuration, a PLMN-specific configuration for the serving network and a default configuration for all PLMN, the UE may register in the serving PLMN with the PLMN-specific configuration but the UE may not indicate, to the network, that the UE also has the default configuration.

Figure 2A:
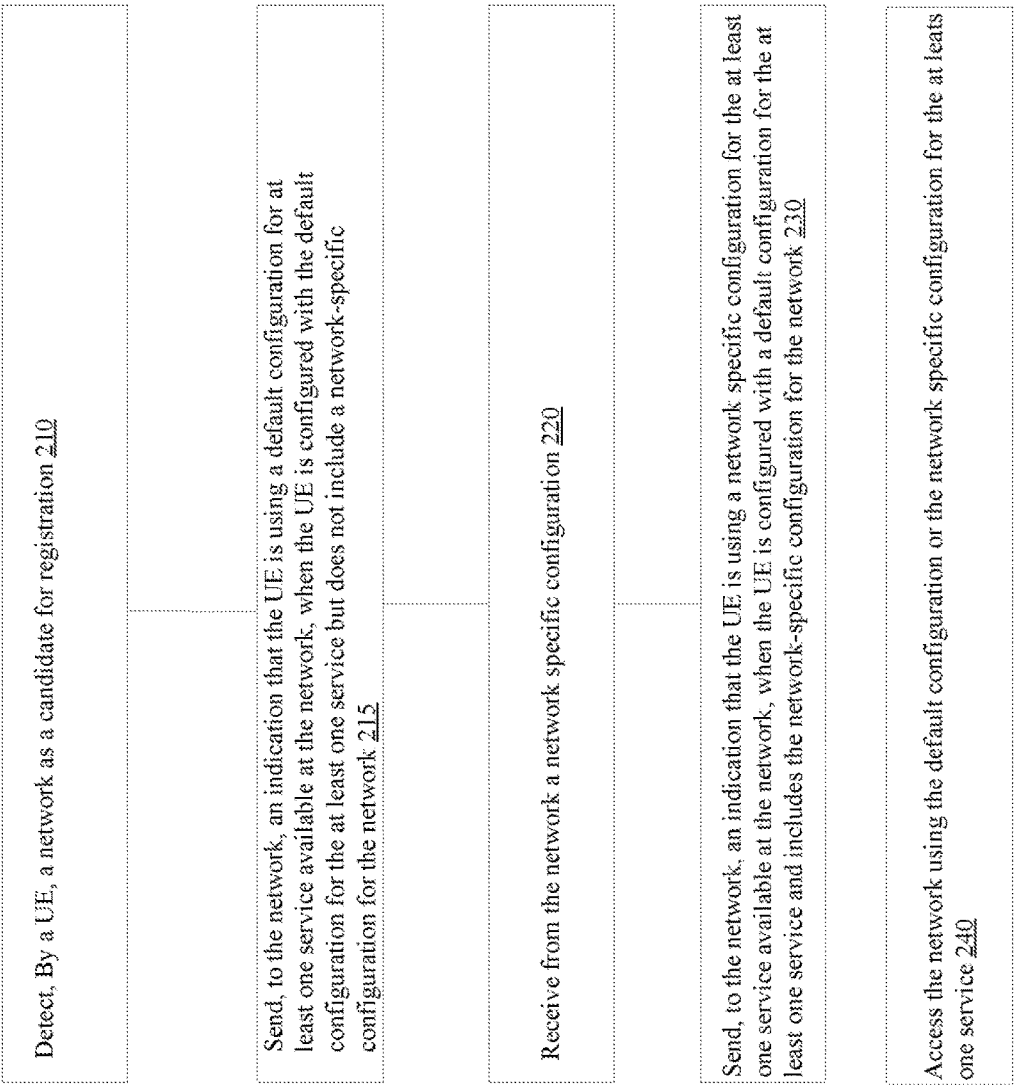
FIG. 2A-FIG. 2C depict examples of process flows for UE configuration, in accordance with some example embodiments.

FIG. 2A depicts an example of a process 200, for configuring a UE, in accordance with some example embodiments.

At 210, the UE may detect as a candidate network for registration, in accordance with some example embodiments. For example, the UE 150 may be roaming and/or visiting another network, in which case it may detect a radio access network 152 being served by a base station and/or other network node. As noted above, the UE 150 may have a network specific configuration that the UE 150 should use to access services, such as network slices, at the VPLMN associated with RAN 152. Alternatively or additionally, the UE 150 may not have the network specific configuration but instead the UE 150 may have a pre-set, or default, configuration that should be used by UE 150, when accessing services in networks. This default configuration should be used by UE 150 in some if not all networks/PLMNs, unless a given serving network being visited has its own network specific configuration that the UE 150 should use to access services. As such, if the registration is accepted by the network, the UE may access the default configuration services at the network.

In accordance with some example embodiments, the UE may send, at 215, to the network an indication that the UE is using a default configuration for at least one service available at the network, when the UE is configured with the default configuration for the at least one service but does not include a network specific configuration for the network. For example, the UE 150 may send to the radio access network 152 in indication (which may be carried by, or comprise, a message, a request, a registration request, and/or the like).

The indication may be an explicit indication that the UE 150 is configured for a pre-set, or default, configuration for accessing at least one service in the network.

In the case of network slicing for example, the registration request may include an indication that a default set of requested NSSAIs is being used, although the indication may correspond to other types of services as well. The indication may be explicit, such as a flag, bit, value, or other indication in the registration request. Alternatively or additionally, the registration request may also include the default set of requested NSSAIs being used. For example, the registration message may include the default configuration (e.g., the configured NSSAI valid for all PLMNs that do not have a network/PLMN specific NSSAI) and the indication that the UE 150 is configured with the default, configuration for accessing at least one service in the network.

In some example embodiments, the indication sent at 215 may indicate each type of configuration, such as whether the default configuration is being used at the UE or a some other configuration is being used (e.g., a network specific configuration). Alternatively or additionally, the indication may signal a default network slicing configuration, while other indicators may be used for other configuration aspects at the UE. In some example embodiments, the indicator may be implemented by one or more bits (or other type of indicator) carried by a message to communicate to the network whether the default configuration is being used and/or the like. Returning to the previous example, the registration message may include the explicit indication that the UE 150 is configured for a pre-set, or default, configuration for accessing at least one service in the network, and the registration message may include one or more other indications to signal to the network other UE configuration aspects at the UE, such as other types of services. To illustrate further, a first indication may be used to signal the network slice configuration being present at the UE, while another indication may be used to signal another service configuration being handled at the UE. For instance, the UE may have a default configuration for network slicing and one default configuration for RAT selection. The default configuration for RAT may provide a preference between 3GPP access or WiFi for certain services, which the serving PLMN may configured differently if, for example, the UE prefers to use WIFI for services that in other PLMNs would use 3GPP access. In this example, the UE may get a new RAT policy from the network when the UE registers.

At 220, the UE may receive from the network a network specific configuration, in accordance with some example embodiments. The network specific configuration may be received by UE 150 in response to sending to the network the indication at 215. As noted, the indicator sent at 215 enable the network (e.g., a network node, such as a base station, AMF, and/or the like) to detect whether a default configuration is being used at the UE, and, as such, whether the network want to update the configuration at the UE. If the network has a network specific configuration that should be used by the UE 150, rather than a default configuration, the network may provide another configuration, such as a network specific configuration for the services being accessed. In the case of network slicing for example, the network may provide configured NSSAIs to the UE for used by the UE 150. The network specific configuration refers to a configuration that is specifically for the network, and in this sense, the network specific configuration is unique to the network.

At 230, the UE may send to the network an indication that the UE is using a network specific configuration for the at least one service available at the network, when the UE is configured with a default configuration for the at least one service and includes the network specific configuration for the network. For example, the UE 150 may send to the radio access network 152 the indication (which may be carried by, or comprise, a message, a request, a registration request, and/or the like), and the indication may indicate that the UE 150 is configured for network specific configuration for accessing at least one service in the network. However, the UE may not indicate to the network that it has a pre-set, or default, configuration. In the case of network slicing for example, the registration request may include a network specific set of requested NSSAIs. In some example embodiments, the indication that the UE is using a network specific configuration may be explicit, in which case the indication may comprise a flag, a bit, a value, or any other type of indication signaling that the UE is using a network specific configuration for the at least one service. Alternatively or additionally, the indication that the UE is using a network specific configuration may be implicit (e.g., the lack of the indication (which sent at 215 by the UE) may signal, to the network, that the UE is using a network specific configuration for the at least one service).

At 240, the UE may access the network, such as RAN 152, using the default configuration or the network specific configuration for the at least one service. For example, when the registration is accepted by the network, the UE may access the network specific services at the network using the default configuration signaled at 215 or the network specific configuration received at 220 (or previously stored at the UE).

Figure 2B:
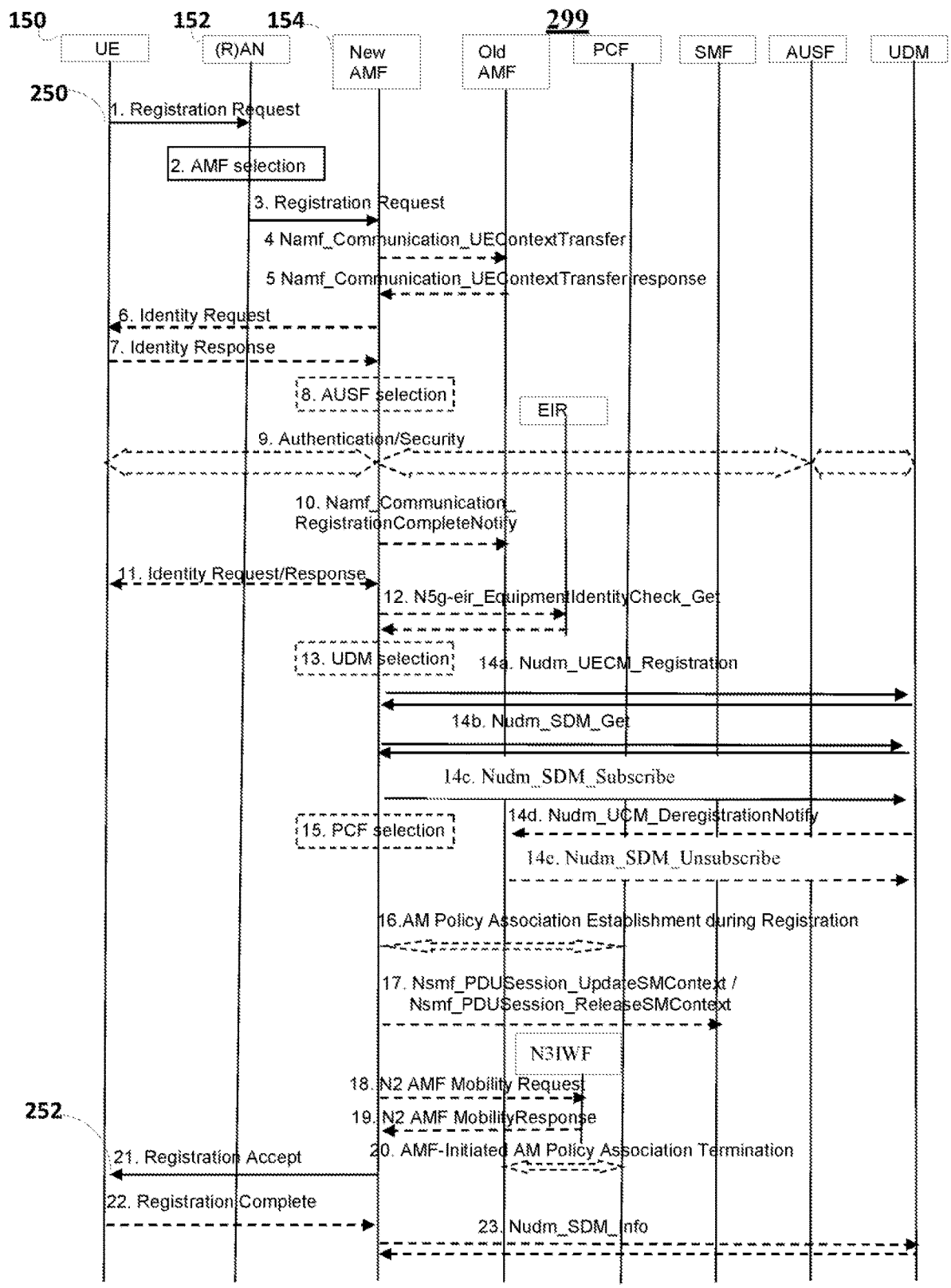

FIG. 2B depicts a UE registration request process 299, in accordance with some example embodiments. The indication described above at FIG. 2A at 215 and 230 may be sent at 250 (FIG. 2B). In the case of network slicing for example, the UE 150 may include, at 250, the indication that it is using information from the configured NSSAI for some if not all PLMNs to compose the requested NSSAI, if it is not configured with PLMN-specific configured NSSAI information.

At 252, the AMF 154 may return a configured NSSAI for the PLMN if the AMF expects the UE to use one and the UE had indicated at 250 that the UE was using information from the configured NSSAI valid for some if not all PLMNs that do not have a network/PLMN specific configured NSSAI. When the requested NSSAI was not included, when the mapping of the S-NSSAIs in requested NSSAI to the corresponding values in the configured NSSAI for the HPLMN is incorrect, when an S-NSSAI was rejected in the PLMN, and/or when the UE indicates it is operating using information in the configured NSSAI for some if not all PLMNs and the serving PLMN expects the UE to use a configured NSSAI specific for the PLMN, the AMF may update the UE network slice configuration information for the PLMN in accordance with, for example, TS 23.501 (see, e.g., clause 5.15.4.2).

Figure 2C:
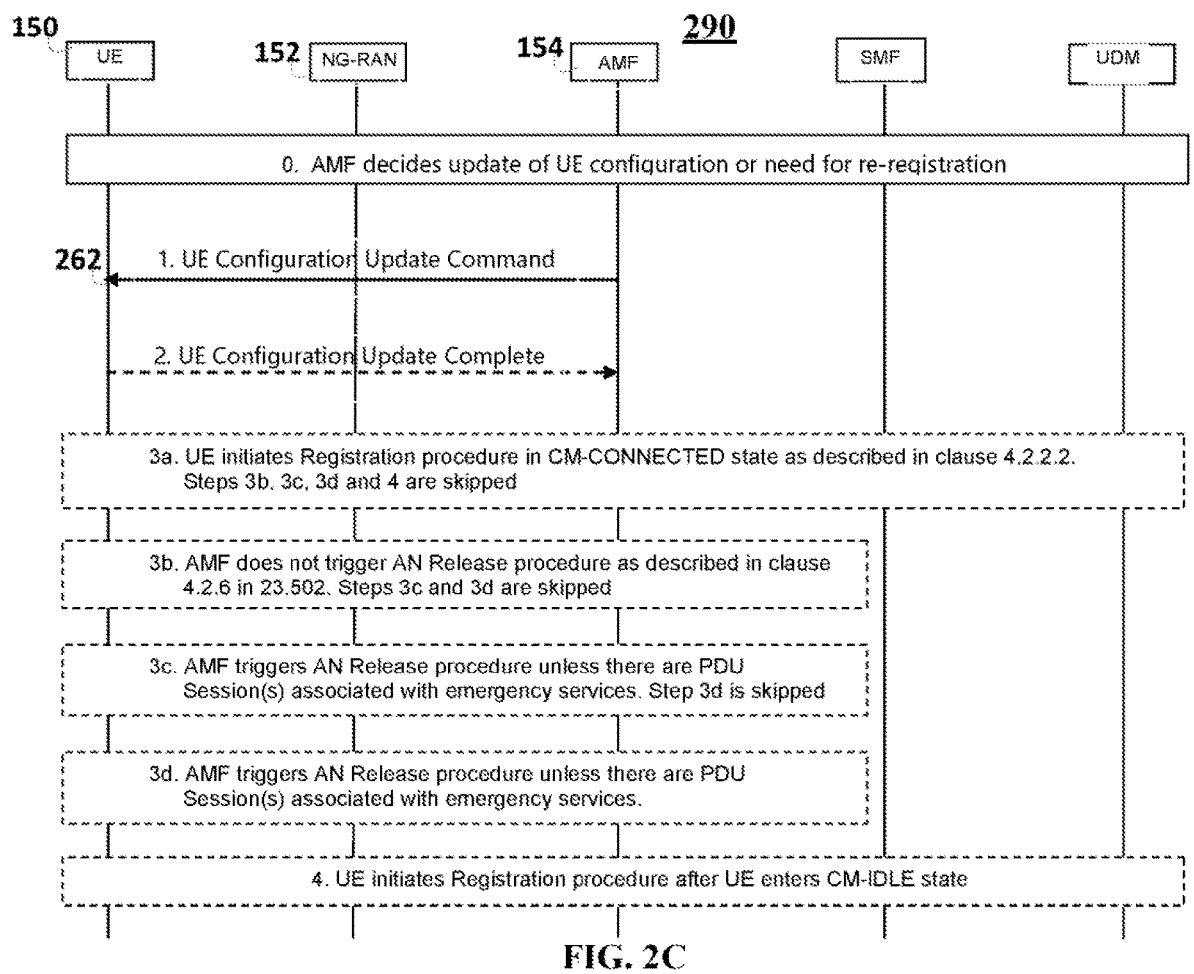

FIG. 2C depicts the AMF performing the UE configuration using a UE configuration update, such as one in accordance with clause 4.2.4 of TS 23.502. FIG. 2C shows a process 290 including the AMF 154 sending, via RAN 152, the configuration information to the UE 150. In this example, it is an updated configuration (e.g., a more current default configuration and/or a network-specific configuration) for the UE 152. In the case of the network slicing, the AMF may provide a configured NSSAI information for the specific network/PLMN being accessed.

Although some of the examples described herein refer to the service as being network slicing, the service, as noted, may correspond to other services as well.

Although some of the examples describe the indication sent at 210 and 230 via a registration message, other types of messages to the network may carry the indication. For example, an authorization message or other type of message may provide the indication to the network.

Figure 3:
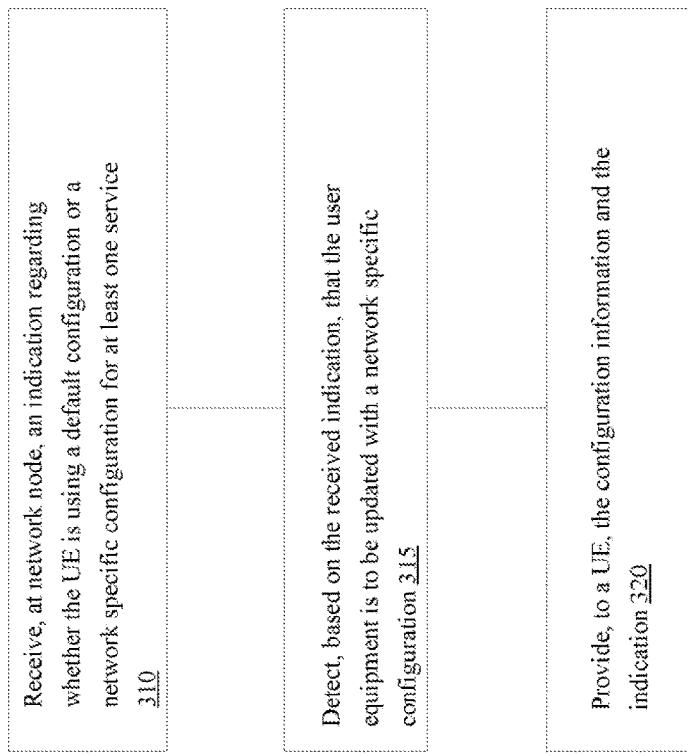
FIG. 3 depicts another example of a process flow for UE configuration, in accordance with some example embodiments.

FIG. 3 depicts an example of a process 300, in accordance with some example embodiments. The description of FIG. 2 refers to FIG. 1 as well.

At 310, a network node, such as a base station serving a radio access network 152, may receive from the AMF 154 an indication regarding whether the UE is using a default configuration for at least one service or a network specific configuration for the at least one service, in accordance with some example embodiments. The indication may be provided as part of a message, request, authorization message, network registration request, and/or other type of message. For example, the network node may receive an explicit indication from the UE that the UE is using the default configuration (which can be used at some if not all PLMNs) for at least one service available at the network. The network node may receive the explicit indication from the UE, when the UE is configured with the default configuration but does not include a network specific configuration for the network.

At 315, the network node may detect, based on the indication that the UE has a default configuration. As such, the network node has knowledge to allow the network node to decide whether to update the default configuration with, for example, a network specific configuration for the network.

At 320, the network node may provide (e.g., send) configuration information to the UE. For example, the network, such as a network node, may provide configuration information to update the UE to use the at least one service at the network. In the case of network slicing, the network node may respond with network specific configuration of configured NSSAI for use at the serving network being visited.

Figure 4:
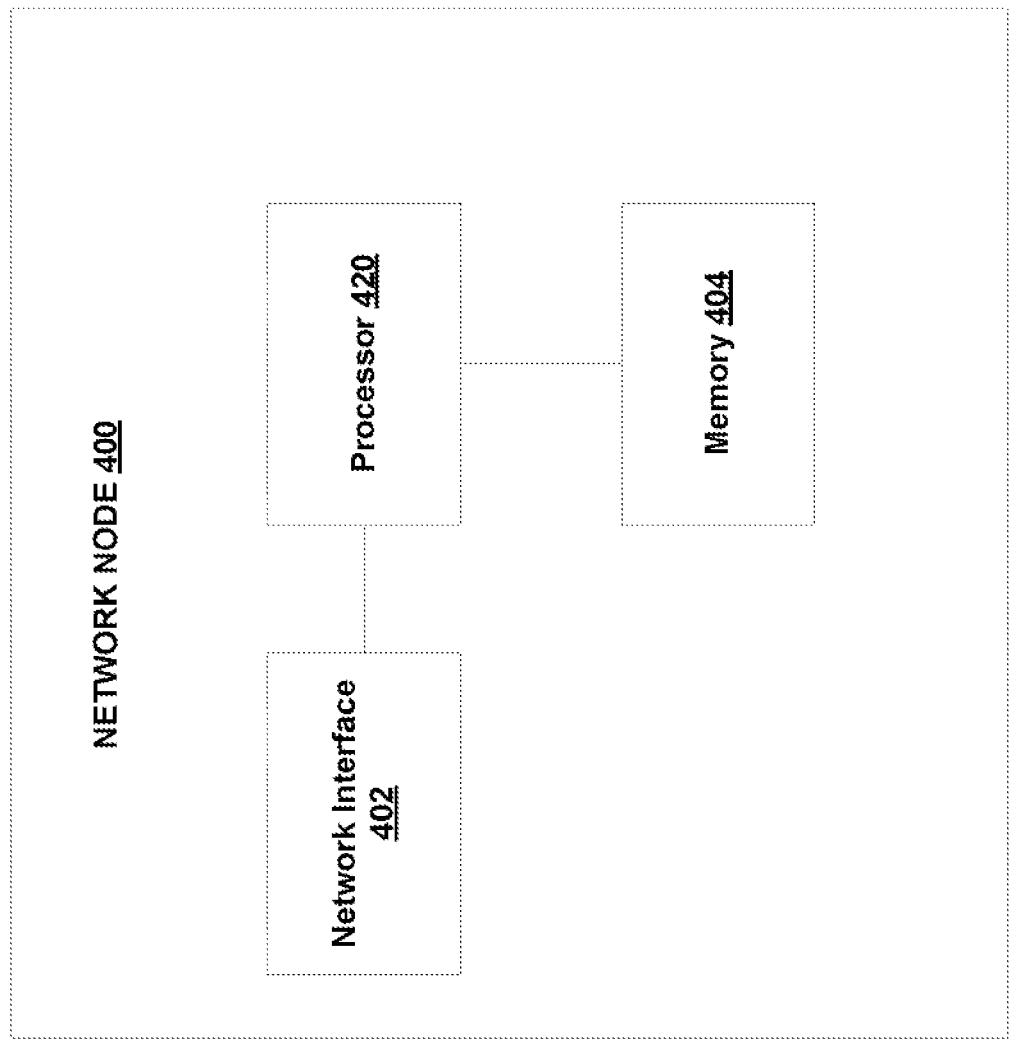
FIG. 4 depicts an example of a network node, in accordance with some example embodiments.

FIG. 4 depicts a block diagram of a network node 400, in accordance with some example embodiments. The network node 400 may be configured to provide one or more network side operations as described with respect to FIG. 3, for example. Moreover, a mobile wireless network may have a plurality of the network nodes 400 as well. For example, the network node may be incorporated into one or more of the devices 152-180.

The network node 400 may include a network interface 402, a processor 420, and a memory 404, in accordance with some example embodiments. The network interface 402 may include wired and/or wireless transceivers to enable access other nodes including base stations, devices 152-180, the Internet, and/or other nodes. The memory 404 may comprise volatile and/or non-volatile memory including program code, which when executed by at least one processor 420 provides, among other things, the processes disclosed herein including process 200, 300, 400, and/or the like.

Figure 5:
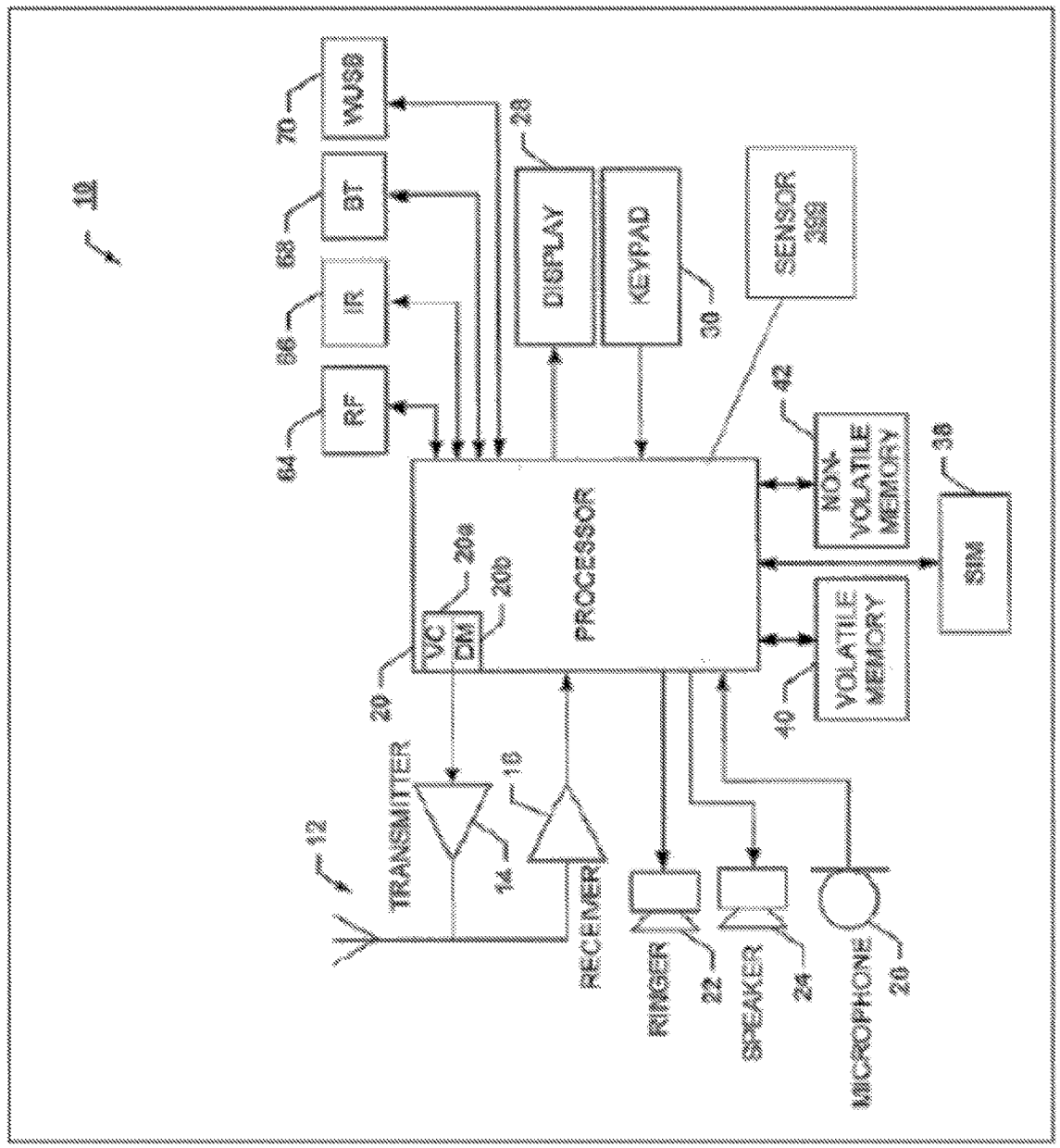
FIG. 5 depicts an example of an apparatus, in accordance with some example embodiments.

FIG. 5 illustrates a block diagram of an apparatus 10, in accordance with some example embodiments.

The apparatus 10 may represent a user equipment, such as the user equipment 150. The apparatus 10, or portions therein, may be implemented in other network nodes including base stations/WLAN access points as well as the other network nodes (e.g., devices 152-184).

The apparatus 10 may include at least one antenna 12 in communication with a transmitter 14 and a receiver 16. Alternatively transmit and receive antennas may be separate. The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 10 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 5 as a single processor, in some example embodiments the processor 20 may comprise a plurality of processors or processing cores.

The apparatus 10 may be capable of operating with one or more air interface standards, communication protocols, modulation types, access types, and/or the like. Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, 802.3, ADSL, DOCSIS, and/or the like. In addition, these signals may include speech data, user generated data, user requested data, and/or the like.

For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, fifth-generation (5G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as LTE Advanced, 5G, and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as a keypad 30 (which can be a virtual keyboard presented on display 28 or an externally coupled keyboard) and/or other input devices.

As shown in FIG. 5, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth™ (BT) transceiver 68 operating using Bluetooth™ wireless technology, a wireless universal serial bus (USB) transceiver 70, a Bluetooth™ Low Energy transceiver, a ZigBee transceiver, an ANT transceiver, a cellular device-to-device transceiver, a wireless local area link transceiver, and/or any other short-range radio technology. Apparatus 10 and, in particular, the short-range transceiver may be capable of transmitting data to and/or receiving data from electronic devices within the proximity of the apparatus, such as within 10 meters, for example. The apparatus 10 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module (SIM) 38, a removable user identity module (R-UIM), an eUICC, an UICC, and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing operations disclosed herein. Alternatively or additionally, the apparatus may be configured to cause the operations disclosed herein with respect to the base stations/WLAN access points and network nodes including the UEs.

The memories may comprise an identifier, such as an international mobile equipment identification (IMEI) code, capable of uniquely identifying apparatus 10. The memories may comprise an identifier, such as an international mobile equipment identification (IMEI) code, capable of uniquely identifying apparatus 10. In the example embodiment, the processor 20 may be configured using computer code stored at memory 40 and/or 42 to the provide operations disclosed herein with respect to the base stations/WLAN access points and network nodes including the UEs (see, e.g., process 200, 290, 299, 300, and/or the like).

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIG. 5, computer-readable medium may comprise a non-transitory computer-readable storage medium that may be any media that can contain or store the instructions for use by or in connection with an instruction execution system, apparatus, or device, such as a computer.

Without in any way limiting the scope, interpretation, or application of the claims appearing below, a technical effect of one or more of the example embodiments disclosed herein may be improved UE configuration.

The subject matter described herein may be embodied in systems, apparatus, methods, and/or articles depending on the desired configuration. For example, the base stations and user equipment (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "computer-readable medium" refers to any computer program product, machine-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the implementations described above may be directed to various combinations and subcombinations of the disclosed features and/or combinations and subcombinations of several further features disclosed above. Other embodiments may be within the scope of the following claims.

If desired, the different functions discussed herein may be performed in a different order and/or concurrently with each other. Furthermore, if desired, one or more of the above-described functions may be optional or may be combined. Although various aspects of some of the embodiments are set out in the independent claims, other aspects of some of the embodiments comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of some of the embodiments as defined in the appended claims. Other embodiments may be within the scope of the following claims. The term "based on" includes "based on at least." The use of the phase "such as" means "such as for example" unless otherwise indicated.

The invention claimed is:

1. A user equipment comprising:
at least one processor; and
at least one memory comprising instructions stored thereon that, when executed by the at least one processor, cause the user equipment to perform at least:
in an instance in which the user equipment has default network slice selection assistance information and the user equipment does not have network specific network slice selection assistance information for a public land mobile network serving the user equipment, sending, to the public land mobile network serving the user equipment, a registration request message comprising the default network slice selection assistance information and an explicit indication that the user equipment is using the default network slice selection assistance information in the public land mobile network serving the user equipment; and
receiving, from the public land mobile network serving the user equipment, in response to the registration request message comprising the explicit indication, the network specific network slice selection assistance information for the public land mobile network serving the user equipment.

2. The user equipment of claim 1, wherein the default network slice selection assistance information is network slice selection assistance information that is valid for all public land mobile networks, including the public land mobile network serving the user equipment, that do not have network specific network slice selection assistance information.

3. The user equipment of claim 1, wherein the default network slice selection assistance information is network slice selection assistance information that is usable to access at least one service in any public land mobile network, including the public land mobile network serving the user equipment, for which the user equipment does not have network specific network slice selection assistance information.

4. The user equipment of claim 1, wherein the user equipment is configured with the default network slice selection assistance information and wherein the default network slice selection assistance information is for accessing at least one service in the public land mobile network serving the user equipment.

5. The user equipment of claim 1, wherein the network specific network slice selection assistance information for the public land mobile network serving the user equipment is network slice selection assistance information that is usable to access at least one service in the public land mobile network serving the user equipment.

6. The user equipment of claim 1, wherein the explicit indication is a bit or flag indicating that the user equipment is using the default network slice selection assistance information.

7. The user equipment of claim 1, wherein the instructions, when executed by the at least one processor, further cause the user equipment to perform at least:
accessing the public land mobile network serving the user equipment using the default network slice selection assistance information or the network specific network slice selection assistance information for the public land mobile network serving the user equipment.

8. The user equipment of claim 1, wherein the instructions, when executed by the at least one processor, further cause the user equipment to perform at least:
sending, to the public land mobile network serving the user equipment, an indication that the user equipment is using the network specific network slice selection assistance information for the public land mobile network serving the user equipment for accessing at least one service in the public land mobile network serving the user equipment.

9. A method comprising:
in an instance in which a user equipment has default network slice selection assistance information and the user equipment does not have network specific network slice selection assistance information for a public land mobile network serving the user equipment, sending, by the user equipment, to the public land mobile network serving the user equipment, a registration request message comprising the default network slice selection assistance information and an explicit indication that the user equipment is using the default network slice selection assistance information in the public land mobile network serving the user equipment; and
receiving, by the user equipment, from the public land mobile network serving the user equipment, in response to the registration request message comprising the explicit indication, the network specific network slice selection assistance information for the public land mobile network serving the user equipment.

10. The method of claim 9, wherein the default network slice selection assistance information is network slice selection assistance information that is valid for all public land mobile networks, including the public land mobile network serving the user equipment, that do not have network specific network slice selection assistance information.

11. The method of claim 9, wherein the default network slice selection assistance information is network slice selection assistance information that is usable to access at least one service in any public land mobile network, including the public land mobile network serving the user equipment, for which the user equipment does not have network specific network slice selection assistance information.

12. The method of claim 9, wherein the user equipment is configured with the default network slice selection assistance information and wherein the default network slice selection assistance information is for accessing at least one service in the public land mobile network serving the user equipment.

13. The method of claim 9, wherein the explicit indication is a bit or flag indicating that the user equipment is using the default network slice selection assistance information.

14. The method of claim 9, further comprising:
accessing, by the user equipment, the public land mobile network serving the user equipment using the default network slice selection assistance information or the network specific network slice selection assistance for the public land mobile network serving the user equipment.

15. The method of claim 9, further comprising:
sending, by the user equipment and to the public land mobile network serving the user equipment, an indication that the user equipment is using the network specific network slice selection assistance information for the public land mobile network serving the user equipment for accessing at least one service in the public land mobile network serving the user equipment.

16. A network node comprising:
at least one processor; and
at least one memory comprising instructions stored thereon that, when executed by the at least one processor, cause the network node to perform at least:
receiving, from a user equipment, a registration request message comprising default network slice selection assistance information being used by the user equipment in a public land mobile network serving the user equipment and an explicit indication that the user equipment is using the default network slice selection assistance information in the public land mobile network serving the user equipment;
determining, based on the explicit indication in the registration request message received from the user equipment, that the user equipment is to be updated with network specific network slice selection assistance information for the public land mobile network serving the user equipment; and
sending, to the user equipment, the network specific network slice selection assistance information for the public land mobile network serving the user equipment.

17. The network node of claim 16, wherein the default network slice selection assistance information is network slice selection assistance information that is valid for all public land mobile networks, including the public land mobile network serving the user equipment, that do not have network specific network slice selection assistance information.

18. The network node of claim 16, wherein the default network slice selection assistance information is network slice selection assistance information that is usable to access at least one service in any public land mobile network, including the public land mobile network serving the user equipment, for which the user equipment does not have network specific network slice selection assistance information.

19. The network node of claim 16, wherein the network specific network slice selection assistance information for the public land mobile network serving the user equipment is network slice selection assistance information that is usable to access at least one service in the public land mobile network serving the user equipment.

20. The network node of claim 16, wherein the explicit indication is a bit or flag indicating that the user equipment is using the default network slice selection assistance information.

21. The network node of claim 16, wherein the instructions, when executed by the at least one processor, further cause the network node to perform at least:
receiving, from the user equipment, an indication that the user equipment is using the network specific network slice selection assistance information for the public land mobile network serving the user equipment for accessing at least one service in the public land mobile network serving the user equipment.

22. A method comprising:
receiving, from a user equipment, at a network node in a public land mobile network serving the user equipment, a registration request message comprising default network slice selection assistance information being used by the user equipment in the public land mobile network serving the user equipment and an explicit indication that the user equipment is using the default network slice selection assistance information in the public land mobile network serving the user equipment;
determining, at the network node, based on the explicit indication in the registration request message received from the user equipment, that the user equipment is to be updated with network specific network slice selection assistance information for the public land mobile network serving the user equipment; and sending, by the network node, to the user equipment, the network specific network slice selection assistance information for the public land mobile network serving the user equipment.

23. The method of claim 22, wherein the default network slice selection assistance information is network slice selection assistance information that is valid for all public land mobile networks, including the public land mobile network serving the user equipment, that do not have network specific network slice selection assistance information.

24. The method of claim 22, wherein the default network slice selection assistance information is network slice selection assistance information that is usable to access at least one service in any public land mobile network, including the public land mobile network serving the user equipment, for which the user equipment does not have network specific network slice selection assistance information.

25. The method of claim 22, wherein the network specific network slice selection assistance information for the public land mobile network serving the user equipment is network slice selection assistance information that is usable to access at least one service in the public land mobile network serving the user equipment.

26. The method of claim 22, wherein the explicit indication is a bit or flag indicating that the user equipment is using the default network slice selection assistance information.

27. The method of claim 22, further comprising:
receiving, at the network node and from the user equipment, an indication that the user equipment is using the network specific network slice selection assistance information for the public land mobile network serving the user equipment for accessing at least one service in the public land mobile network serving the user equipment.

28. A non-transitory computer-readable storage medium comprising instructions stored thereon that, when executed by a processor of a user equipment, cause the user equipment to perform at least the following:
in an instance in which the user equipment has default network slice selection assistance information and the user equipment does not have network specific network slice selection assistance information for a public land mobile network serving the user equipment, sending, by the user equipment, to the public land mobile network serving the user equipment, a registration request message comprising the default network slice selection assistance information and an explicit indication that the user equipment is using the default network slice selection assistance information in the public land mobile network serving the user equipment; and
receiving, by the user equipment, from the public land mobile network serving the user equipment, in response to the registration request message comprising the explicit indication, the network specific network slice selection assistance information for the public land mobile network serving the user equipment.

29. A non-transitory computer-readable storage medium comprising instructions stored thereon that, when executed by a processor of a network node, cause the network node to perform at least the following:
receiving, at the network node, from a user equipment, a registration request message comprising default network slice selection assistance information being used by the user equipment in a public land mobile network serving the user equipment and an explicit indication that the user equipment is using the default network slice selection assistance information in the public land mobile network serving the user equipment;
determining, using the network node, based on the explicit indication in the registration request message, that the user equipment is to be updated with network specific network slice selection assistance information for the public land mobile network serving the user equipment; and
sending, by the network node, to the user equipment, the network specific network slice selection assistance information for the public land mobile network serving the user equipment.

* * * * *